Patented Feb. 25, 1930

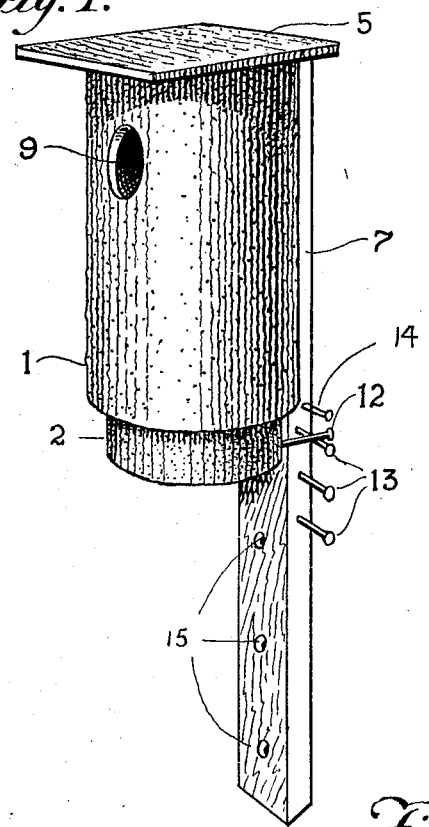

1,748,349

UNITED STATES PATENT OFFICE

HARRY P. IJAMS, OF KNOXVILLE, TENNESSEE

BIRD BOX

Application filed May 9, 1928. Serial No. 276,402.

This invention relates to bird boxes to be occupied by birds for laying their eggs and hatching and feeding their young, the box being built in form to be attached to the walls of buildings or to the trunks of trees or to columns or posts.

The object of the invention is to produce such a box including an upper section and a lower section, the lower section being removable for cleaning and for observing and studying the eggs and young birds and to afford opportunity to band young birds.

Another object is to produce a bird box, the entrance of which may be easily closed, whereby the box is made a trap to allow access to the brooding bird for banding, or to allow capturing English sparrows, starlings, or other pest birds.

Another object of the invention is to make the bottom or lower part of the box adjustable, whereby the interior depth of the box may be made suitable for different kinds of birds or birds building nests in different forms.

Another object of the invention is to provide ample indirect ventilation for the interior of the box without admitting rain or snow.

In the accompanying drawings,

Fig. 1 is a perspective of a bird box embodying my improvement;

Fig. 2 is an upright section through the door or port;

Fig. 3 is a horizontal section on the line, 3—3, of Fig. 2;

Fig. 4 is a horizontal section on the line, 4—4, of Fig. 2.

Referring to the drawings, 1 is the upper or outer section of the bird box; and 2 is the lower or inner section. The section, 2, telescopes into the section, 1. The drawings show these two sections in cylindrical form; but it is to be understood that they may be of other form in cross section. The upper section has a top wall, 3, placed to fill the space within the upper part of the upright wall of the upper section and secured by gluing or nailing. Usually it is desirable to make the upright wall of this section of thin or light material, while the top wall, 3, is made thicker, to give stability to that section. The section, 2, has a bottom, 8, fitted within the upright wall and secured by glue or nailing.

The upright walls of each section may be made of sheet metal or wood or ordinary paper or tar building paper. The latter is sufficiently durable and is inexpensive. Such tar paper is easily shaped and is to a large extent weather proof.

The upper section has a hole or port, 9, placed high enough to leave it above the upper edge of the lower section at all times excepting when the lower section is to be moved upward for trapping the bird or birds. Said section, 1, is secured against the upright supporting member, 7, which extends downward below both sections to allow laying the member, 7, flatwise against any wall or tree trunk or post, or similar stationary object, and there securing the member, 7, by nails or screws extending through the holes, 15, in said member. The upper end of this member, 7, is even with the upper edge of the section, 1. A board, 5, or similar plate extends across the upper end of the member, 7, and across the upper end of the section, 1, and has its edges projecting forward and laterally beyond the section, 1, far enough to serve in part to protect the section, 1, from rain. This plate is suitably secured to any or all of the members on which it rests.

The lower section is shown provided with means for supporting it on the member, 7. As here shown, a nail, 12, or other projecting member is driven part way into the base of the section, 2, in position to adapt it to rest on nails, 13 or 14, or other projecting members extending outward from one face of the member, 7, the nails on the member, 7, being at different elevations, the lowest being low enough to allow setting the section, 2, at what is to be its lower limit, and the nail, 14, being at a height which will cause the upper edge of the section, 2, to cover the hole or port, 9, for trapping the bird or birds in the box. When the nail, 12, is in engagement with one of the other nails it may be released by partially turning the lower section, 2. To re-engage the nail, 12, the lower section is to be turned backward.

The exterior diameter of the section, 2, is to be made less than the interior diameter of the section, 1. That will allow air to circulate up or down between the two sections. This circulation of air will tend to keep the lower or inner section cool, even though the sun shines on and heats the upper or outer section. Thus the outer section serves as a cooling jacket for the inner section. It will be noted that building and occupying the nest will not interfere with this air passage.

It is to be noted that, by providing the removable lower section, the interior of this bird box may be inspected while the box is placed higher than would be permitted if the upper part of the box were hinged to give access to the interior. My improved box need be placed only low enough to permit reaching the lower end of the lower section by the hand when the arm is stretched upward. And the supporting member, 7, may, in many cases, be attached without the use of a ladder, the member, 7, preferably reaching downward far enough for inserting the nails or screws through the lower part of the member, 7. For this purpose the member, 7, is preferably provided with the holes, 15, to receive screws in place of nails, in order that the structure may afterward be detached and again attached elsewhere.

I claim as my invention:

1. In a structure of the kind described, two upright tubular telescoping sections of approximately equal length, the lower section extending loosely into the upper section and having a bottom, and the upper end of the upper section being closed and having a lateral hole or port, a supporting member attached to and extending downward below the upper section and adapted to be secured to a stationary object, and means for holding the lower section in position in the upper section.

2. In a structure of the kind described, two upright tubular telescoping sections of approximately equal length, the lower section extending loosely into the upper section and having a bottom, and the upper end of the upper section being closed and having a lateral hole or port, a supporting member attached to and extending below both of said sections and adapted to be secured to a stationary object, and means for holding the lower section in position in the upper section.

3. In a structure of the kind described, two upright tubular telescoping sections of approximately equal length, the lower section extending loosely into the upper section and having a bottom, and the upper end of the upper section being closed and having a lateral hole or port, a supporting member attached to the upper section and adapted to be secured to a stationary object, and means for engaging the lower section and the supporting member.

4. In a structure of the kind described, two upright tubular telescoping sections of approximately equal length, the lower section extending loosely into the upper section and having a bottom and the upper end of the upper section being closed and having a lateral hole or port, a supporting member attached to the upper section and adapted to be secured to a stationary body, and said supporting member and said lower section having inter-engaging means for supporting said lower section at different elevations.

5. In a structure of the kind described, two upright tubular telescoping sections of approximately equal length, the lower section extending loosely into the upper section and having a bottom and the upper end of the upper section being closed and having a lateral hole or port, a supporting member attached to the upper section and means adapted to be secured to a stationary object, and said supporting member and said lower section having inter-engaging means for supporting said lower section at different elevations, one of said elevations being high enough to make the lower section close the hole or port of the upper section.

6. In a structure of the kind described, two upright tubular telescoping sections of approximately equal length, the lower section extending loosely into the upper section and having a bottom and the upper end of the upper section being closed and having a lateral hole or port, a supporting member attached to the upper section and adapted to be secured to a stationary object, a projecting member on the lower section, and a projecting member located on the supporting member and adapted to engage the other projecting member for supporting the lower section.

7. In a structure of the kind described, two upright tubular telescoping sections of approximately equal length, the lower section extending loosely into the upper section and having a bottom and the upper end of the upper section being closed and having a lateral hole or port, a supporting member attached to the upper section and adapted to be secured to a stationary object, a projecting member on the lower section, and a plurality of projecting members located on said support and adapted to engage the projecting member on the lower section.

8. In a structure of the kind described, two upright tubular telescoping sections of approximately equal length, the lower section extending into the upper section and having a bottom and the upright exterior face of the lower section being spaced from the interior upright face of the upper section, whereby an air passage between said sections is provided, and the upper end of the upper section being closed and having a lateral hole or port, a supporting member attached to the upper section and adapted to be secured to a stationary object, and means for holding the lower section in position in the upper section.

9. In a structure of the kind described, two tubular telescoping sections of approximately equal length, the upper section having its upper end closed and having in its upper part a lateral hole or port and the lower section having a bottom and extending loosely into the upper section and being long enough to permit being moved upward to extend over said hole or port, and means for supporting the lower section relative to the upper section.

10. In a structure of the kind described, two tubular telescoping sections of approximately equal length, the upper section having the upper end closed and having in its upper part a lateral hole or port and the lower section having its lower end closed and said section extending loosely into the upper section and being long enough to be extended over said hole or port, means for supporting the lower section relative to the upper section, and means for attaching the upper section to a stationary object.

In testimony whereof I have signed my name, this 7th day of May, in the year one thousand nine hundred and twenty-eight.

HARRY P. IJAMS.